Figure 1:
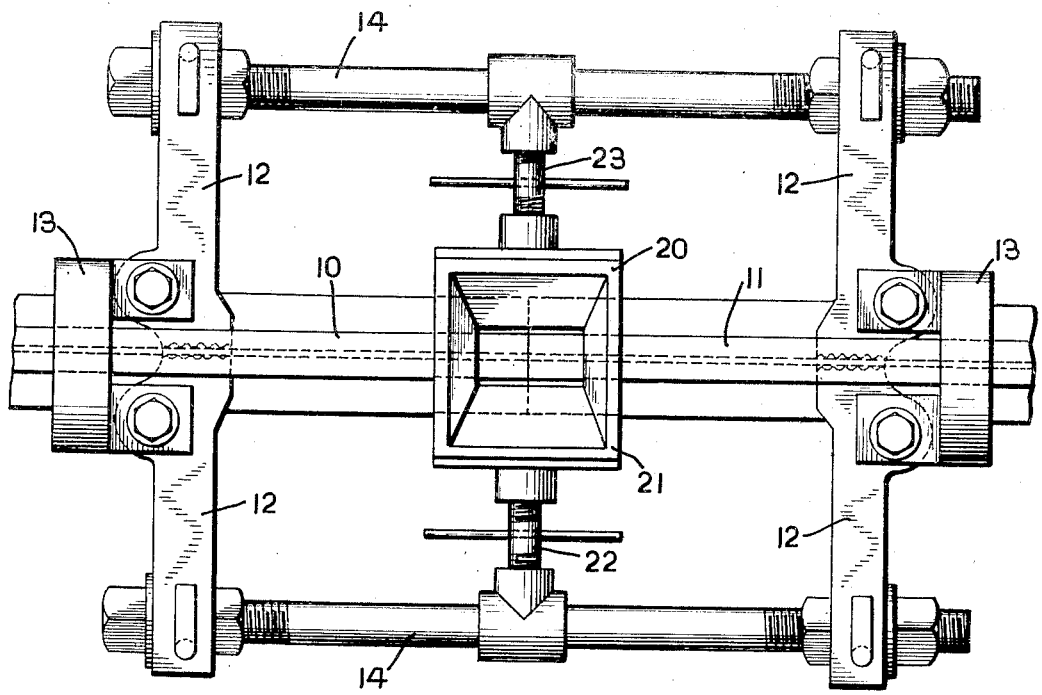

Sept. 10, 1929.   H. G. SPILSBURY   1,727,570
WELDING PROCESS
Filed Aug. 6, 1927

Inventor
HUGH G. SPILSBURY
By his Attorney Albert M. Austin

Patented Sept. 10, 1929.

1,727,570

UNITED STATES PATENT OFFICE.

HUGH G. SPILSBURY, OF CRANFORD, NEW JERSEY, ASSIGNOR, BY MESNE ASSIGNMENTS, TO FRANCIS EARLE, OF MONTCLAIR, NEW JERSEY.

WELDING PROCESS.

Application filed August 6, 1927. Serial No. 211,212.

This invention relates to a method of welding and more particularly to a new and improved process of butt welding rails by superheated molten metal in which the necessity of cleaning the ends of the rail heads and for forming the heads in exact parallelism is avoided.

The invention provides for the welding without previous cleaning of surfaces which are not in exact parallelism. This is accomplished by separating the surfaces by a thin layer of solid flux and applying suitable heat and pressure to melt the flux, remove the same from between the surfaces and bring said surfaces into intimate contact. The flux serves to remove dirt and grease and allow clean surfaces to be brought together at the welding temperature.

The invention further provides for evenly distributing the heat between the surfaces by forming the flux in a mesh of iron wires. The iron serves as a good heat conductor and at the welding temperature becomes molten or plastic and is forced out. Consequently, it does not contaminate the finished weld.

In the case of butt welding rails by the addition of superheated molten metal, the amount of material required is considerably reduced by preheating in order to bring the rails to a temperature somewhat below the usual welding temperature. The heat of the material is then utilized to raise the temperature of the rail from the temperature of the preheat to that necessary to produce the butt weld. The solid flux is inserted between the rail heads and serves to dissolve and remove any foreign particles which would interfere with the efficient welding operation and to permit the metal in the two rails to be brought into intimate contact upon the application of suitable pressure.

The invention further provides in carrying on the new and improved process, a mixture of flux and iron particles which may be enmeshed in a screen of iron wires whereby a solid cake is formed. This cake may be readily handled, formed to the required size and located between the rail heads prior to the welding operation. By reason of certain properties of the above mentioned cake of flux and iron particles the welding temperature of the rail is considerably reduced and the operation may be carried on with a minimum amount of end-pressure.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

In the following description and in the claims the various steps in the process and the details comprising the invention will be identified by specific names for convenience but they are intended to be as generic in their application as the art will permit.

In the drawings forming part of the specification

Figure 2:
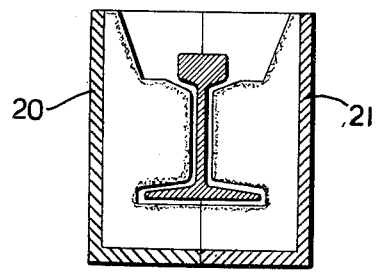

Fig. 1 is a plan view of a pair of rails in position to be welded with the clamping means and mold in place; and Fig. 2 is a sectional view of the rail and mold showing the relative location of the parts.

The process may be applied to surface welding in general and is particularly applicable for direct welding a portion of the surface while joining the remainder thereof by the addition of molten metal. The flux may be placed between the portions to be direct welded and prevents the molten metal from entering the same.

The invention is particularly applicable to butt welding rails in the aluminothermic process and will be described particularly with respect thereto as an illustration of one commercial embodiment thereof.

The process as applied to rails may be carried on in a plurality of steps involving inserting a mixture of flux and iron particles between the two rails which are to be butt welded clamping the two rail ends firmly together, locating a mold around the proposed joint and preheating the rails to a comparatively high temperature such as to a bright red heat. Since the rails are tightly clamped, the expansion caused by the preheating will serve to compress the filler of flux and iron particles and hold the same rigidly in place. The temperature of the preheat must, however, be sufficiently low to prevent fusion of the filler and particularly of the flux contained therein. After the preheating has been completed the aluminothermic mixture is ignited and the molten metal and slag poured into the mold. The quantity of mixture employed should preferably be such that the metal itself completely surrounds the rail base and web and reaches the level of the bottom of the rail head. The slag which forms thereon completely surrounds the top and sides of the rail head but is prevented from entering between the two rails by reason of the filler of flux material. The slag is of sufficiently high temperature to heat the rail heads to a welding temperature and to fuse the flux and iron particles contained therein. Pressure should then be applied to the rails for squeezing out substantially the entire amount of flux and iron particles and bringing the heads themselves into intimate contact. The molten metal will then unite with the rail base and web to form an intimate union and the rail heads themselves will be firmly welded together.

Various details are involved in successfully completing a weld by the above described process which will be set forth by considering a specific example in which a particular type of rail is welded such as the high carbon rail commonly used in this country in electric railways. The process may be carried out by attaching suitable clamps to the two adjacent rails designed to hold the heads in alignment and to exert pressure when required in a longitudinal direction. After the clamps have been applied a mixture of flux and iron particles preferably in the form of sheet is inserted between the rail heads.

A suitable type of flux which has been found to be satisfactory consists essentially of borax in which particles of finely ground ferrous metal have been embedded. This mixture is then firmly compressed and a netting of iron wire inserted therein. Suitable grooves may be formed at intervals in the surface of the material in order to facilitate breaking off particles of the size required for welding.

A portion of the above described sheet of material which for convenience, will be hereinafter termed filler, of a size slightly larger than the cross section of the rail head itself but not extending any appreciable distance below the head into the web portion of the rail, is inserted between the rail heads and held in position by applying pressure thereto as by drawing up on the clamps.

In the case of a guard or lip rail, this filler is also inserted between the lip and head portion of the rail but does not extend an appreciable amount therebelow. It has been found that the filler should extend approximately one-eighth of an inch beyond the rail head itself in order to secure the desirable results.

After the filler has been inserted and pressure applied thereto, suitable molds such as the type composed of sand and fire clay, commonly employed in the aluminothermic process, may be placed around the rails opposite to the proposed joint. The molds should preferably be of such shape that when filled with metal the molten material will surround the ends of the rails, extending only a slight distance beyond the sides of the rail when the mold is removed.

The rail may then be preheated as by applying a torch at a point near the base thereof, the mold being provided with a suitable opening for permitting access to the rail. Highly heated gases or any other suitable means of heating the rail may be employed if desired. The preheating should be continued until the rail reaches a comparatively high temperature, such as a bright red heat and in addition to heating the rail serves to dry the mold.

When the rail has been sufficiently heated the source of heat may be removed, the hole in the mold plugged and the molten metal and slag run in as in the usual aluminothermic process.

In this process, however, the molds are so designed that the amount of steel produced by the reaction is only sufficient to fill the mold around the base and web of the rail and to come in contact with the lower part of the rail head itself. The molten slag which follows the steel is allowed to surround the top and sides of the rail head and is at a sufficiently high temperature, as for example in the neighborhood of 5000° F., to quickly heat the rail head to the welding temperature. After the heat from the slag has been transferred to the rail head, which usually requires from one to two minutes, pressure is applied by means of the above mentioned clamps and the two rails drawn firmly together.

The pressure should be such that the flux and the iron particles in the filler, which may be molten or plastic, are squeezed out from between the rails and the metal in the rail heads themselves brought into intimate contact. Pressure is then continued until the welding operation is completed which usually is accompanied by a slight upsetting of the rail heads.

In the drawings the process is illustrated as applied to a pair of rails 10 and 11 which are arranged in abutting relationship. Suitable clamping means, such as arms 12, supported on opposite sides of the rail web by means of yoke 13 may be employed for firmly engaging the sides of the rail and applying longitudinal pressure thereto. Connecting members 14 may be located between the ends of the respective arms 12 on the same side of the rail and utilized for applying force in a direction transverse to said arms, causing the same to swing about their pivotal connection with yoke 13 whereby in a single operation the arms are brought into firm engagement with the sides of the rail web and are caused to apply a longitudinal stress thereto.

A mold comprising a pair of sections 20 and 21 is positioned about the abutting rail sections and pressed into operative relationship as by means of threaded rods 22 and 23 extending between said mold sections and clamping rods 14. Rods 22 and 23 may be threaded in reverse directions on their two ends whereby a simple turning movement may be employed for applying pressure to the sides of the mold sections.

In the welding operation carried on in accordance with the present invention, a pair of rails are placed in abutting relationship, and the flux material is placed between the adjoining rail heads.

After the rails have been prepared as above described, clamping members are affixed and sufficient pressure is applied thereto to hold the two rails in firm abutting engagement. The mold may then be positioned around the joint and firmly clamped in position.

In order to conserve the amount of molten metal required to bring the rail to the proper welding temperature, the rail may be preheated as by directing the flame from a heating torch thereon.

After the rail has been preheated to the required temperature, the flame may be removed and superheated molten metal from any desired source, such as an aluminothermic reaction pot may be run into the mold.

One example of a process by which the above mentioned filler may be produced comprises introducing a percentage of grained or dust steel or iron into a pot containing molten borax. The metallic portion of the mixture may comprise iron or steel filings or other suitable form of grained or powdered ferrous metals or alloys. Grained low carbon steel which will pass through approximately a 14 mesh screen has been found to be satisfactory for this purpose. After the material has been incorporated in the molten borax the mixture is poured into molds or rolled into sheets, as desired. The sheets may preferably be formed by suspending wire netting in the middle section of the mold and pouring the molten mixture thereabout. Upon cooling, a sheet in the form of a wafer is obtained, the fine wire serving to maintain the sheet in its original shape and permit shipment without breakage. The wire serves a further function by reason of its high heat conductivity. When placed between the rail heads the fine wire allows the heat to be readily transferred to the center portion of the head and produces a much more uniform result than would be otherwise obtained.

Although applicant is not aware of the exact scientific theory of operation of the above described filler, the following are believed to constitute the principles involved. The borax or other material constituting the flux serves to remove any grease, oxides or other foreign matter from the rail heads or from the steel particles embedded therein. These particles consequently become soft and plastic when heated without oxidation and without being carbonized during pre-heating. The steel or iron particles are of a lower melting point than the high carbon rail steel and by becoming molten serve to lower the fusion point of the surface of the rail head and prepare the surface for actual welding. This may be due to the fact that the rail heads tend to go into solution in the molten metal in a manner similar to that in which iron or steel may be dissolved in a bath of molten aluminum which has a temperature below the melting point of steel.

Heretofore it has been difficult to obtain the desired results in the butt welding process since it was impossible to locate the powdered flux between the rail ends. By producing the above described filler however, in which the flux occurs in the form of a solid cake it may be readily applied to the rail heads and held in intimate contact therewith during the preheating and up to the actual welding operation.

By preheating prior to pouring the superheated molten metal a saving of from 40 to 50 percent in the amount of said mixture is obtained due to the fact that less heat is required than would be the case were the cold rail brought to the welding temperature by means of the heat of the mixture itself. Furthermore, in the case of high carbon steel rails serious results are likely to occur from introducing highly heated molten material against the welded rail.

A further advantage of this process resides in the fact that it has been found unnecessary to bring the surfaces into exact parallelism. This is probably due to the fact that the welding operation is carried on at a sufficient temperature and pressure to produce a slight upsetting of the parts and consequently brings all portions thereof into intimate contact.

The use of the filler permits the rail heads to be heated by means of the slag and at the same time prevents the slag from entering into the space between the heads. In case a filler were not employed it would obviously be difficult to prevent the slag from entering this space and contaminating the weld.

The use of the above described filler allows the web and the base of the rail to be separated so that the molten metal can flow therebetween and cause much firmer union to be obtained than would otherwise be the case since the molten steel from the aluminothermic mixture unites with the rail base and with the web in the usual manner for further strengthening the joint.

It has been found that rail heads united in accordance with the above process break with a true fracture instead of with a flat surface and thereby indicate that a positive weld is obtained.

The above description has been specifically applied to rail welding but obviously the process is capable of wide application, especially to cases where a portion of the surfaces is to be direct welded and another portion joined by molten metal. The invention has been described as carried out in connection with the aluminothermic welding process but it may be utilized to advantage with other processes such as the induction furnace process wherein the metal may be superheated electrically and poured into the molds.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of butt welding rails which comprises preheating said rails and subsequently applying superheated molten metal thereto in such proportions that the molten iron therein surrounds the rail base and web only.

2. The process of butt welding rails which comprises placing said rails in aligned relationship and applying superheated molten metal and slag thereto, the quantity of said metal being regulated so that the molten metal therein surrounds the rail base and rail web while the slag surrounds the rail head.

3. The process of butt welding rails which comprises preheating said rails to a red heat and subsequently bringing said rails to a welding temperature by means of slag produced by the aluminothermic process.

4. The process of butt welding rails which comprises bringing said rails into aligned position, inserting a quantity of flux between the rail heads and bringing said rails to a welding temperature by means of superheated molten metal.

5. The process of butt welding rails which comprises placing said rails in aligned position, inserting a solid flux between the head portions thereof and applying a quantity of molten metal and slag thereto, said quantity being such that the molten metal contained therein enters between the web and base portions of said rails and the slag surrounds the head portion thereof.

6. The process of butt welding rails which comprises inserting a solid flux between the head portions thereof, welding the base and web portions by means of a molten metal and bringing the head portions to a welding temperature by means of slag floating on said metal.

7. The process of butt welding rails which comprises inserting a filler composed of flux and iron particles between the head portions thereof and applying molten metal and slag to said rails in such quantity that the molten metal therein surrounds and joins the rail base and rail web and the slag thereof surrounds the top and sides of the rail head and brings the same to a welding temperature.

8. The process of butt welding rails which comprises inserting a solid flux between the head portions thereof, heating said rails to a red heat and applying molten metal and slag to said joint in such quantity that the molten metal therein surrounds and unites the rail base and rail web and the slag surrounds the top and sides of said rail head and raises said head to a welding temperature.

9. The process of butt welding rails which comprises inserting a solid flux between the head portions thereof, heating said rails to a red heat, applying molten metal and slag to said joint in such quantity that the molten metal therein surrounds and unites the rail base and rail web and the slag thereon surrounds the top and sides of said rail head and raises said head to a welding temperature and applying longitudinal pressure to said rails for squeezing out said flux and bringing said heads into intimate contact.

10. The process of butt welding rails which comprises inserting a solid flux between the head portions thereof, heating said rails to a red heat, applying molten metal and slag to said joint in such quantity that the molten metal therein surrounds and unites the rail base and rail web and the slag thereon surrounds said rail head and raises said head to a welding temperature and applying longitudinal pressure to said rails for squeezing out said flux and bringing said heads into intimate contact, said pressure being sufficient to cause a slight upsetting of said heads.

11. The process of butt welding rails which comprises placing a filler between the rail heads, said filler comprising a solid flux and a wire mesh embedded therein, applying sufficient pressure to said rails to hold said filler in position, positioning a mold around said joint, and pouring a quantity of molten metal and slag in said mold such that the molten metal therein surrounds the rail base and rail web to the level of the lower part of the rail head and the slag surrounds the top and sides of the rail head and increasing the pressure to an amount sufficient to substantially squeeze out said filler, said head being brought to a welding temperature by heat absorbed from said slag.

12. The process of butt welding rails which comprises placing a filler between the rail heads extending slightly beyond the same, said filler comprising a solid flux and a wire mesh embedded therein, applying sufficient pressure to said rails to hold said filler in position, positioning a mold around said joint, preheating the rail and pouring a quantity of molten metal and slag in said mold such that the molten metal therein surrounds the rail base and rail web and the slag surrounds the rail head, and increasing the pressure to an amount sufficient to substantially squeeze out said filler, said head being brought to a welding temperature by heat absorbed from said slag.

13. The process of butt welding rails which comprises placing a filler between the rail heads extending slightly beyond the outside surfaces thereof, said filler comprising a solid flux having iron particles and a wire mesh embedded therein, applying sufficient pressure to said rails to hold said filler in position, positioning a mold around said joint, preheating the rail to a red heat and pouring a quantity of molten metal and slag in said mold such that the molten metal therein surrounds the rail base and rail web to the level of the lower part of the rail head and the slag surrounds the top and sides of the rail head and increasing the pressure to an amount sufficient to substantially squeeze out said filler, said head being brought to a welding temperature by heat absorbed from said slag.

14. The process of welding metals which comprises inserting a solid flux between a portion of the surfaces to be welded, pouring molten metal between the remainder of the surfaces for welding and for raising the temperature of said first portion to a welding heat, and applying pressure to force said flux from between said surfaces and producing a direct weld thereof.

15. The process of butt welding metals which comprises inserting a solid flux between a portion of the surfaces to be welded, pouring molten metal between the remainder of said surfaces for uniting therewith and for raising the temperature of said first portion to the welding temperature, and applying pressure to said metals for forcing said flux from between said surfaces and produce a butt weld on said first mentioned portion.

16. The process of welding metals which comprises spacing the surfaces to be welded by means of a solid flux occupying a portion only of said surface, welding the spaced surfaces by the addition of molten metal and butt welding the surfaces adjacent said flux by raising to a welding temperature and applying pressure sufficient to force said flux from between said surfaces.

In testimony whereof I have hereunto set my hand.

HUGH G. SPILSBURY